United States Patent
Ohler et al.

(10) Patent No.: US 9,956,614 B2
(45) Date of Patent: May 1, 2018

(54) ASSEMBLY HAVING TWO COMPONENTS CONNECTED COHESIVELY TOGETHER

(75) Inventors: Martin Ohler, Vorchdorf (AT);
Christian Kronberger, Vorchdorf (AT);
Horst Roessler, Krenglbach (AT);
Alexander Mueller, Altmuenster (AT)

(73) Assignee: Miba Sinter Austria GmbH, Laakirchen (AT)

( * ) Notice: Subject to any disclaimer, the term of this patent is extended or adjusted under 35 U.S.C. 154(b) by 439 days.

(21) Appl. No.: 14/233,931

(22) PCT Filed: Jul. 11, 2012

(86) PCT No.: PCT/AT2012/050100
§ 371 (c)(1),
(2), (4) Date: Jan. 29, 2014

(87) PCT Pub. No.: WO2013/013254
PCT Pub. Date: Jan. 31, 2013

(65) Prior Publication Data
US 2014/0138428 A1    May 22, 2014

(30) Foreign Application Priority Data
Jul. 22, 2011   (AT) .................. A 1075/2011

(51) Int. Cl.
*B22F 7/06*   (2006.01)
*B22F 7/08*   (2006.01)
(Continued)

(52) U.S. Cl.
CPC ............ *B22F 7/062* (2013.01); *B22F 5/08* (2013.01); *B22F 7/06* (2013.01); *F16D 2023/0625* (2013.01)

(58) Field of Classification Search
CPC .... B22F 7/06; B22F 7/062; B22F 5/08; F16D 2023/0625
See application file for complete search history.

(56) References Cited

U.S. PATENT DOCUMENTS 3,678,557 A    7/1972   Howard
3,710,071 A *  1/1973   Volker ................ F16D 69/0408
                                                      219/93

(Continued)

FOREIGN PATENT DOCUMENTS

AT    507 913 A1    9/2010
CN    1062808 A     7/1992
(Continued)

OTHER PUBLICATIONS

International Search Report of PCT/AT2012/050100, dated Jan. 15, 2013.
Chinese Search Report dated Feb. 17, 2015 in CN 201280035440.X.

*Primary Examiner* — Keith Walker
*Assistant Examiner* — John A Hevey
(74) *Attorney, Agent, or Firm* — Collard & Roe, P.C.

(57) ABSTRACT

The invention relates to an assembly (1) at least comprising a first metal component (2) having a first surface region (5) and a second metal component (3) having a second surface region (7), wherein the two surface regions (5, 7) face each other, and the first and the second component (2, 3) are connected cohesively together at least in a subregion of the two surface regions (5, 7), and wherein at least one of the two metal components (2, 3) is a sintered component, wherein that surface region (7) of the sintered component that has the cohesive connection has a higher density than the adjoining further surface region of the sintered component.

6 Claims, 2 Drawing Sheets

(51) Int. Cl.
 B22F 5/08 (2006.01)
 *F16D 23/06* (2006.01)

(56) References Cited

U.S. PATENT DOCUMENTS

| | | |
|---|---|---|
| 5,453,242 A | 9/1995 | Knoess |
| 6,090,320 A | 7/2000 | Grundner et al. |
| 6,193,927 B1 * | 2/2001 | Jones .................. B22F 3/12 |
| | | 419/29 |
| 2004/0136858 A1 | 7/2004 | Woolf |
| 2004/0177719 A1 | 9/2004 | Kosco |
| 2007/0029290 A1 * | 2/2007 | Kehrer .................. B23K 26/28 |
| | | 219/121.14 |
| 2008/0134507 A1 | 6/2008 | Kotthoff |
| 2008/0166579 A1 | 7/2008 | Kotthoff |
| 2008/0170960 A1 | 7/2008 | Kotthoff et al. |
| 2008/0209730 A1 * | 9/2008 | Kotthoff .............. B21H 5/022 |
| | | 29/893.3 |
| 2009/0257905 A1 * | 10/2009 | Hartner .................. B22F 3/03 |
| | | 419/66 |
| 2011/0253499 A1 * | 10/2011 | Kronberger .............. B21J 5/002 |
| | | 192/108 |
| 2012/0210813 A1 | 8/2012 | Zeller et al. |

FOREIGN PATENT DOCUMENTS

| | | |
|---|---|---|
| CN | 101193719 A | 6/2008 |
| CN | 101389429 A | 3/2009 |
| CN | 101541452 A | 9/2009 |
| DE | 42 11 319 A1 | 10/1993 |
| DE | 197 52 380 A1 | 6/1998 |
| DE | 10 2006 028 286 A1 | 12/2007 |
| EP | 0 563 949 A1 | 10/1993 |
| EP | 0 565 160 A1 | 10/1993 |
| GB | 2 320 032 A | 6/1998 |
| WO | 2006/131349 A2 | 12/2006 |
| WO | 2011/038790 A1 | 4/2011 |
| WO | WO2011/038790 A1 * | 4/2011 |
| WO | WO 2011/041811 A1 * | 4/2011 ............... B21K 1/30 |

* cited by examiner

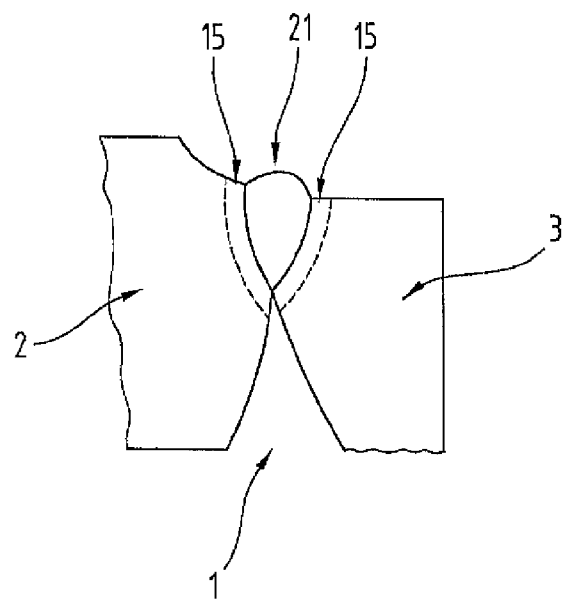
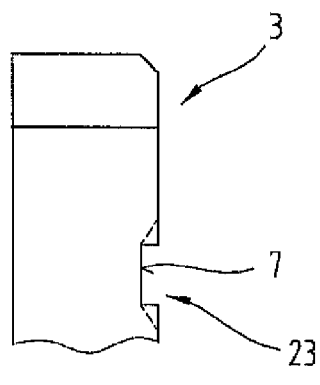  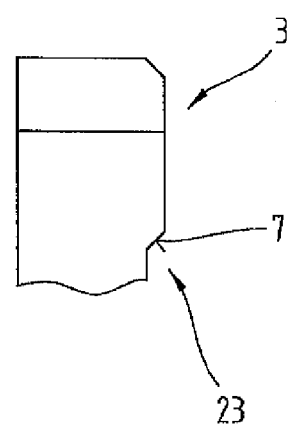

US 9,956,614 B2

ASSEMBLY HAVING TWO COMPONENTS CONNECTED COHESIVELY TOGETHER

CROSS REFERENCE TO RELATED APPLICATIONS

This application is the National Stage of PCT/AT2012/050100 filed on Jul. 11, 2012, which claims priority under 35 U.S.C. § 119 of Austria Application No. A 1075/2011 filed on Jul. 22, 2011, the disclosure of which is incorporated by reference. The international application under PCT article 21(2) was not published in English.

The invention relates to an assembly comprising at least a first metal component having a first surface region and a second metal component having a second surface region, wherein the two surface regions face each other, and the first and the second component are connected cohesively together at least in a subregion of the two surface regions, and wherein at least one of the two metal components is a sintered component, and a method for cohesively connecting a first metal component with a first surface region to a second metal component with a second surface region, wherein the two surface regions face one another and wherein at least one of the two components is a sintered component.

Various different methods are already known from the prior art for connecting a gear wheel to a coupling body.

For example, EP 0 563 949 A1 describes a method for the production of a two-part component, namely a gear wheel with a coupling body on a seat of the gear wheel, in particular for synchromesh transmissions, in which the gear wheel and the coupling body are produced separately and are joined together securely afterwards, which is why one of the two parts is heated and connected to the other part by shrink fitting. In this way a gear wheel is produced with a coupling body in which the gear wheel and the coupling body are joined together not only by frictional connection but also by form fitting.

DE 10 2006 028 286 A1 describes gear wheels consisting of a gear wheel and a coupling body, which fitted together in their common connecting fitting form have a profile differing from an exact circle, e.g. any polygonal form. To prevent the two parts slipping apart an adhesive is provided in the common fitting form, whereby the two parts are often displaced against one another until by means of "seizing" the desired connection strength is achieved. After this the region is caulked.

GB 2 320 032 A describes a method for producing a sintered component with a different diameter along the main axis by connecting two part bodies and then sintering jointly.

From U.S. Pat. No. 3,678,557 A a method is known, according to which a cast gear wheel is connected to a coupling body made of sintered metal by welding.

WO 2011/038790 A1 describes an arrangement comprising a gear wheel and a coupling body, which is connected in a form-closed manner to the gear wheel for the transmission of a rotational movement, wherein the gear wheel and the coupling body on facing end sides each have a geometry which in connection with the geometry of the respective other component forms a form-closed connection, wherein the gear wheel and the coupling body respectively are configured as components produced by sintering technology and wherein the respective end side geometry is pressed into the gear wheel and the coupling body, by means of which the gear wheel and the coupling body can be positioned relative to one another. The gear wheel and the coupling body can also be connected to one another in a cohesive manner.

The objective of the present invention is to improve the weldability of a sintered metal component to an additional metal component.

Said objective is achieved independently by the aforementioned assembly and the aforementioned method respectively, wherein in the assembly the surface region of the sintered component comprising the cohesive connection has a greater density than the adjoining additional surface regions of the sintered component, and according to the method prior to the formation of the cohesive connection of the two components to one another in the surface region of the sintered component the density is increased.

It is an advantage that by means of the compaction of the surface region of the sintered component, in which the welding seam is applied, prior to the welding of the two components together a reduction is achieved in the porosity of the sintered material. This prevents washing fluids—usually the sintered components are cleaned before welding at least in the region of the subsequent welding seam—evaporating out of the pores during the welding, whereby then the formation of blowholes is avoided in the welding seam or at least reduced. The bond strength of the component can be increased in this way. Compared to the solution according to WO 2011/038790 A1, according to which a form closure is formed between the components, by means of the assembly of the invention also an axial thrust is avoided when transmitting torques. It is also an advantage that by means of only partial compaction the porosity is retained in another area of the sintered component, a property which is desirable in itself in sintered components, in particular when the latter are so-called wet-running sintered components, i.e. sintered components which can be supplied during the operation with a lubricant for reducing friction and for cooling, as the pores are known to function as lubricant pockets.

Preferably, the surface region of the sintered component has a density of at least 95% of the total density of the material, whereby the aforementioned effects of improved weldability can be improved further. It is thus also possible to use welding methods more efficiently, which are associated with problems in the field of sintered components, in particular laser welding or electron beam welding.

The deformation is at least mostly avoided by compacting the surface region owing to the increased friction on the end faces. Below said surface region thus a so-called "forging cross" is avoided with high tensile stresses on the side areas and high shearing strengths in the central area. In order to avoid excessively high stresses in the sintered component in the region of the welding seam it is therefore an advantage if the surface region of the sintered component has a width which corresponds at least to the welding seam width and to a maximum of seven times the welding seam width. The upper limit is selected with regard to the desired open porousness, as a wider, more compacted area does not improve the weldability of the sintered components further. It is preferred if the compacted area of the sintered component has a larger cross-sectional area than the cross-sectional area of the welding seam, as viewed in the same direction, as in this way negative influences of the washing medium from areas of the sintered component adjoining the welding seam can be better avoided and the welding process itself can be simplified.

It is also an advantage in this case if the sintered component in the surface region is compacted up to a depth of at least the welding seam width, in order during the heating of the sintered component during the welding to avoid more reliably the formation of faults in the welding seam or in areas close to the surface below the welding seam from the outgassing of the washing medium.

It is also possible that both metal components are configured as sintered components, wherein both the first surface region of the first sintered component and the second surface region of the second sintered component are compacted. In this way all of the known advantages of sintering technology, such as e.g. the simple production of more complex geometries can be achieved in the entire assembly.

According to a preferred embodiment variant of the assembly the first component is configured as a gear wheel and the second component as a coupling body of a transmission synchronization.

According to one embodiment variant of the method for the production of the compacted surface region the latter is produced with an excess. In this way the compaction of the surface region can be produced by simple material displacement into the component in this area.

It is particularly advantageous in this case if the compaction of the surface region is performed during the calibration of the sintered component. As the calibration of the sintered component usually for increasing the precision of the component already forms part of the processing sequence for producing the assembly, in this way there is no need for an additional method step in the production of the surface compaction, whereby the method can be made more efficient.

It is also possible that the two metal components are only hardened after joining, whereby the quality of the welding seam and the entire assembly can be improved.

For a better understanding of the invention the latter is explained in more detail with reference to the following figures.

In a schematically simplified representation:

FIG. 5 shows a welding seam between two components with compacted surface regions;

FIG. 6 shows a cut-out of an embodiment variant of a coupling body in cross section in side view;

FIG. 7 shows a cut-out of an embodiment variant of a coupling body in cross section in side view.

Figure 1:
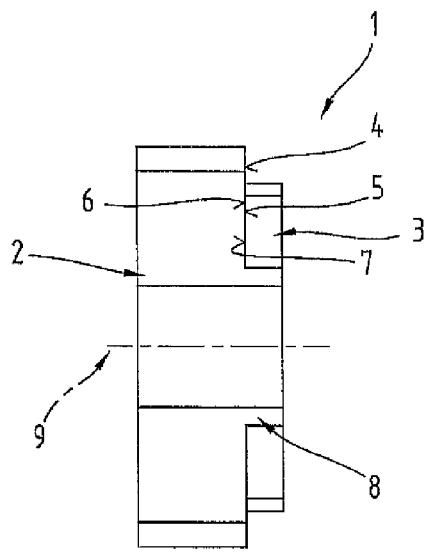
FIG. 1 shows an assembly in cross section in side view.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc, relate to the currently described and represented figure and in case of a change in position should be adjusted to the new position.

FIG. 1 shows an assembly 1 comprising or consisting of a first metal component 2 and an independent second metal component 3. The first component 2 comprises a first surface 4 which includes a first surface region 5. The second component 3 comprises a second surface 6 which includes a second surface region 7. The second component 3 is arranged on the first component 2 so that the two surfaces 4, 6 and thus also the two surface regions 5, 7 point to one another. For example, the second component 3 can be arranged on a hub-like projection 8 of the first component 2 which extends along a central axis 9. The two components 2, 3 are joined together in a cohesive manner in at least one subregion of the surface regions 5, 7, in particular welded, wherein the two surface regions 5, 7 are arranged lying at least almost directly next to one another—in the direction of the central axis 9.

Preferably, the first component 2 is a gear wheel, in particular a toothed gear wheel, and the second component 3 is a coupling body, such as components used in transmission synchronizations. In principle, the assembly 1 can however also comprise differently formed metal components 2, 3, which are joined together in a cohesively, for example the coupling body can also be connected to a sprocket wheel or a hollow shaft. It is also possible for the first component 2 to be a shaft and the second component 3 to be a synchronizer hub connected to the shaft. In this case the latter need not comprise the usual plug-in gearing.

At least one of the two metal components 2, 3 is a sintered component, i.e. produced by means of a sintering method. Preferably, the coupling body, i.e. the component 3, is a sintered component.

As sintering methods are known from the prior art reference is made to the relevant literature for a detailed explanation. Usually sintering methods include the steps of possibly powder mixing, powder pressing to form a green part, sintering and finishing the sintered component. If necessary also a two-step sintering can be performed with a pre-sintering stage.

The sintered component can for example be made from a conventionally used steel powder. However, also other metal powder (mixtures) can be used within the scope of the invention for the production of the sintered component. With regard to the usually used metal powders reference is also made to the relevant literature and the relevant standards that are associated with the content of the present description.

The other component, i.e. in particular the metal component 2, can be made from a solid material, i.e. for example steel or another metal or another metal alloy. For example the component 2 can be cast component which is finished afterwards if necessary.

In one embodiment variant the component 2 can however also be configured as a sintered component. Reference is made to the preceding explanations on sintering the component 3. The following explanations regarding the sintered component, i.e. the component 3, can therefore also be applied to this embodiment variant of the component 2.

However, it is also possible for the component 2 to be configured as a sintered component and the component 3 to be made from a solid material.

To improve the cohesive connection, in particular the weldability, of the sintered component, i.e. in particular of component 3 and/or component 2, at least in the part of the surface 6 and/or 4, in which the additional material is applied for the formation of the cohesive connection, i.e. in particular the welding seam is formed, the latter is compacted prior to the formation of the cohesive connection. Said part of the surface 6 and/or 4 thus corresponds to the aforementioned surface regions 5 and/or 7 of components 2 and/or 3, wherein the cohesive connection can also only be formed in a subregion of said surface regions 5 and/or 7. The surface regions 5 and/or 7 thus have a higher density than the additional surface regions of the components 2 and/or 3 surrounding the surface regions 5 and/or 7. Of course, the areas of the components 2 and/or 3 lying immediately below the surface regions 5 and/or 7 because of the compaction also have a greater density, possibly greater than lower lying core layers of the component 2 and/or 3, so that within the meaning of the invention the compaction relates to the surface region 5 and/or 7 not just exactly the surface.

Figure 2:
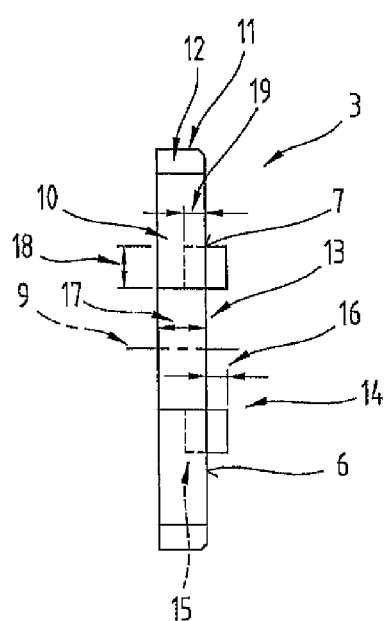
FIG. 2 shows a coupling body in cross section in side view.

One possibility for forming the compacted surface regions 5 and/or 7 is represented in FIG. 2.

FIG. 2 shows the component 3 configured as a coupling body for a transmission synchronization in cross section in side view and in a simplified form. The component 3 comprises a component body 10 which on a radially outwardly pointing end face 11 has a conventional toothing 12 for engaging a sliding sleeve of the transmission synchronization. In the area around the central axis 9 an opening 13 or a bore is formed into which the hub-like projection 8 of the component 2 (FIG. 1) can be inserted. The surface region 7 to be compacted is located immediately adjacent to the opening 13, as in this area in the shown embodiment variant the cohesive connection is formed with the component 2.

It should be noted that the precise location of the compacted surface region 7 is dependent on the point on which the material-bonded connection is to be formed. In other words the location of said surface region 7 can vary according to the assembly from the situation shown in FIG. 2, so that the shown positioning should be defined as limiting for the invention.

To achieve the compaction the component 3 is produced in the area of the surface region 7 to be compacted with an excess, so that the semi-finished product produced after sintering comprises a projection 14, which is formed in the shown embodiment variant of the component 3 as an annular web. In a compaction step performed after the sintering said projection 14 can be pressed by means of suitable pressing stamp or other suitable compaction tool into the material of the component body 10, whereby in said surface region 7 a compacted zone 15 is formed which is indicated in FIG. 2 by a dashed line.

Alternatively to this, it is also possible for the compaction to be performed prior to sintering, in that the green part is formed during the powder pressing in this area with a suitably larger amount of powder.

The compacted surface region 7 is preferably made from the same material as the remaining component body 10. However, it is also possible in this surface region 7 to provide a material that has a different composition from the composition of the material of the remaining component body 10, for example with a composition which facilitates the compaction or has more favorable properties with regard to the cohesive connection. The introduction of this additional material can be performed during the powder pressing, for example in that a corresponding recess is provided for this in the powder press, or after sintering by applying onto the sintered semi-finished product, whereby it is possible in the latter case because of easier handling for the additional material to also be already compacted and if necessary sintered. Likewise said additional material can be applied in a two-step sintering method after pre-sintering and sintered together with the other material.

The projection 14 can for example have a height 16 in the direction of the central axis 9 which is selected from a range with a lower limit of 3% and an upper limit of 150%, in particular a lower limit of 5% and an upper limit of 40%, of a component height 17 in this region.

Preferably, the compaction is performed so far that said surface region 7 of the sintered component has a density of at least 95%, in particular at least 97%, preferably at least 98%, of the total density of the material of the component 3 or the used additional material.

By means of the compaction of the surface region 7 in the shown embodiment variant an annular compacted zone 15 is formed around the opening 13, wherein the surface 6 itself is planar after the compaction or corresponds to the desired component geometry of the finished component in this region, i.e. because of the compaction no additional projections are provided—although this is possible in principle.

It should be noted that the rectangular form of the compacted zone 15 shown in FIG. 2 has been simplified or idealized. In practice, because of the formation of the so-called "forged cross" during the compaction said compacted region in the embodiment variant shown develops a different form. For this reason it is an advantage if the surface region 7 of the sintered component has a width 18, which corresponds at least to the width of the cohesive connection, for example one welding seam width, in particular at least 1.5-times, preferably at least twice the width and a maximum of seven times the width of the cohesive connection. In this way a compromise can be made between the size of the compacted area and mechanical load of the compaction tool, since as the size of the compacted zone increases the loading of the tool also increases.

A depth 19 of the compacted zone 15 in the direction of the central axis 9 can correspond at least to the width of the cohesive connection, wherein the compaction can also be performed over the entire component height 17.

Figure 3:
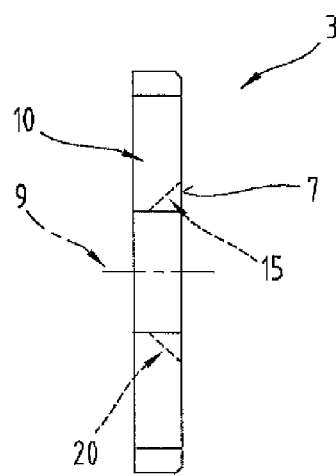
FIG. 3 shows an embodiment variant of a coupling body in cross section in side view.

To clarify that the compacted surface region 7 or the compacted zone 15 can also be configured differently, FIG. 3 shows the component 3 in cross section and in a simplified view which can also be configured as a coupling body, with a boundary line 20 running obliquely to the central axis 9 between the uncompacted and compacted area of the component body 10. Said compacted zone 15 is also achieved by means of deforming or pushing in the projection 14—not shown in FIG. 3 —, wherein the compacting tool operates obliquely to the central axis on the component body 10.

By way of the method according to the invention when using a sintered steel the compacted area can have for example a density of over 7.5 g/cm$^3$, the remaining area of the component body however has a density of below 7.5 g/cm$^3$ (=basic density).

The compaction of the surface region 7 is, as already explained above, preferably performed during the calibration of the sintered component with a corresponding calibrating tool, for example a calibrating press. The calibration is known to increase the form precision of a sintered component.

If necessary, at least the sintered component, preferably the whole assembly 1, can be hardened after joining, for example by case hardening. Subsequently, a hard fine processing of the assembly 1 or the sintered component can be performed, for example on the bearing points or on the conical or planar surfaces. The hard fine processing also increases the precision of the component geometry.

The cohesive connection between the two components 2, 3 at least in a subregion of their surface can be formed with or without an additional material. If an additional material is used this corresponds to the prior art regarding cohesive connections. In particular, the two components 2, 3 are welded together, wherein other methods are also possible, such as for example soldering. Preferably, the two components 2, 3 are connected together by laser welding or electron beam welding.

Figure 4:
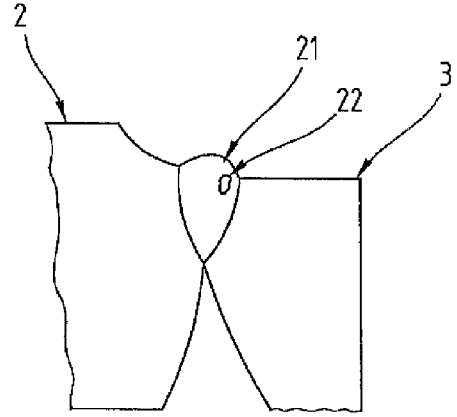
FIG. 4 shows a welding seam according to the prior art.

To clarify the effect achieved by means of the invention FIG. 4 shows a welding seam 21 between component 2 and component 3. The two components 2, 3 correspond to the prior art and thus have no compacted zones 15. The effect of the washing medium evaporating during welding from the pores of the sintered component 3 cause blowholes 22 to be formed in the welding seam 21 which lead to a weakening of the welding seam 21.

In contrast FIG. 5 shows a welded assembly 1 according to the invention, wherein in this case both components 2, 3 are configured as sintered components and each comprise the compacted zone 15 in the region of the welding seam 21. However, it should be noted in particular again that it is also possible within the scope of the invention for one of the two components 2, 3 not to be a sintered component but a component made from a solid material.

As shown in FIG. 5 the welding seam 21 is formed to be free of blowholes.

FIGS. 6 and 7 show embodiment variants of the compaction of the surface region 7 in components 3, in particular coupling bodies. In this case the compaction of the surface region 7 is not produced by pressing in an additional amount of material, but a recess 23 is formed by the compaction which can possibly be configured to be undercut or beveled. Said recess 23 is then at least almost completely filled during the cohesive connection preferably with the welding material. It is shown that as with the embodiment variant of the component 3 according to FIG. 2 an annular groove can be formed or as with the embodiment variant of the component 3 according to FIG. 3 a bevel can be formed.

Of course, it is also possible within the scope of the invention that a plurality of compacted surface regions 7 are formed. It is also possible to combine a planar, compacted surface region 7 with a compacted surface region 7 depressed from forming the recess 23 into one component 2 and/or 3.

Furthermore the designs of coupling bodies shown in FIGS. 2, 3, 6, 7 are only shown by way of example. The latter can generally have a geometry that corresponds to the prior art, i.e. can also be configured with a cone.

The exemplary embodiments show possible embodiment variants of the assembly 1 or the components 2, 3, whereby it should be noted at this point that various different combinations of the individual embodiment variants are also possible and this variability, due to the teaching on technical procedure, lies within the ability of a person skilled in the art in this technical field.

Finally, as a point of formality, it should be noted that for a better understanding of the structure of the assembly 1 or the components 2, 3 the latter have not been represented true to scale in part and/or have been enlarged and/or reduced in size.

LIST OF REFERENCE NUMERALS

1 Assembly
2 Component
3 Component
4 Surface
5 Surface region
6 Surface
7 Surface region
8 Projection
9 Central axis
10 Component body
11 End face
12 Toothing
13 Opening
14 Projection
15 Zone
16 Height
17 Component height
18 Width
19 Depth
20 Boundary line
21 Welding seam
22 Blowhole
23 Recess

The invention claimed is:

1. A method for welding of a first metal component with a second metal component, the first metal component comprising a first surface region, the second metal component comprising a second surface region, the first surface region facing the second surface region, the method comprising steps of:
forming the first metal component with an excess only in the first surface region, the excess comprising a projection in the first surface region;
compacting the projection of the first metal component into a body of the first metal component at the first surface region of the first metal component
such that a density of the body of the first metal component is increased in the first surface region such that the first surface region is a compacted surface region and
such that the first metal component is a sintered component;
welding the first metal component with the second metal component at least in the compacted surface region such that the first metal component and the second metal component welded to each other form an assembly;
forming the second metal component with an excess, the excess comprising a projection in the second surface region; and
compacting the projection of the second metal component into a body of the second metal component at the second surface region of the second metal component
such that a density of the body of the second metal component is increased in the second surface region such that the second surface region is a compacted surface region and
such that the second metal component is a sintered component;
wherein the welding step occurs via a welding of the first surface region to the second surface region along a welding seam having a welding seam width;
wherein the compacted surface region has a depth and forms a lateral edge of the first metal component along the depth;
wherein the depth is greater than or equal to the welding seam width;
wherein the compacted surface region of the sintered component has a width; and
wherein the width of the compacted surface region corresponds at least to the welding seam width and to a maximum of seven times the welding seam width.

2. The method as claimed in claim 1, further comprising a step of calibrating the first metal component,
wherein the compacting step is performed during the calibrating step.

3. The method as claimed in claim 1, further comprising a step of hardening the assembly.

4. The method as claimed in claim 1, wherein a first material having a first composition is in the first surface region,
wherein a second material having a second composition is in a remaining portion of the first metal component, and wherein the first composition is different from the second composition.

5. The method as claimed in claim 1, wherein the compacted surface region of the sintered component is compressed to a density of at least 95% of a total density of remaining material of the first metal component.

6. The method as claimed in claim 1, wherein the lateral edge of the first metal component is an inner edge immediately adjacent to a central opening of the first metal component.

* * * * *